Figure 1:
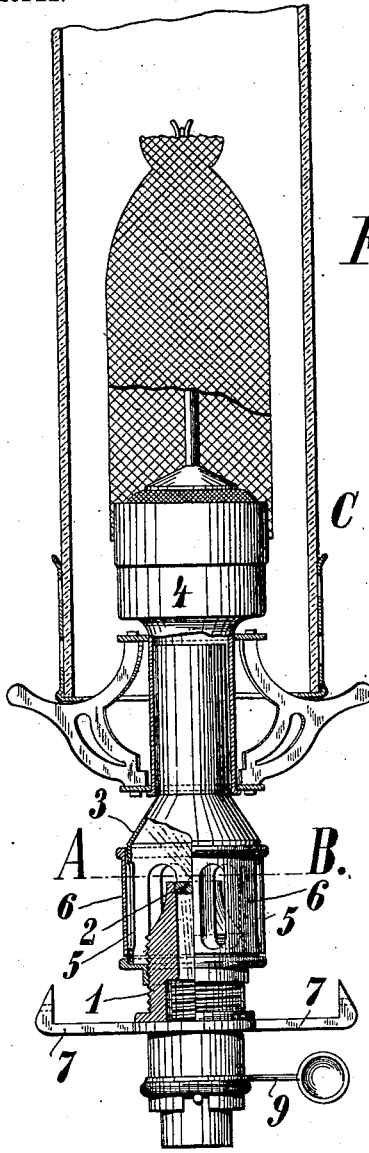

No. 727,257. PATENTED MAY 5, 1903.
A. BACHNER.
GAS BURNER.
APPLICATION FILED JULY 21, 1902.
NO MODEL. 3 SHEETS—SHEET 1.

WITNESSES:
Henry J. Suhrbier
Conrad Zimmer

INVENTOR
Adolf Bachner
BY Groner & Niles
ATTORNEYS.

No. 727,257. PATENTED MAY 5, 1903.
A. BACHNER.
GAS BURNER.
APPLICATION FILED JULY 21, 1902.
NO MODEL. 3 SHEETS—SHEET 2.

WITNESSES:
Henry J. Suhrtier.
Conrad Timmer?

INVENTOR
Adolf Bachner
BY Foweek Niles
ATTORNEYS.

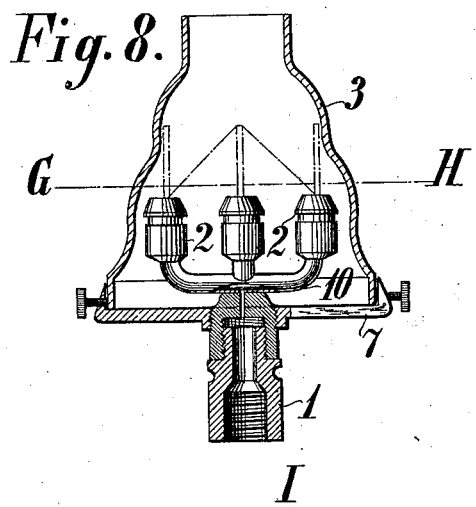
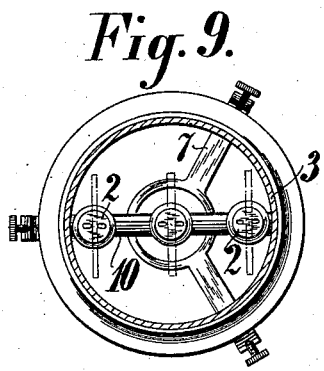
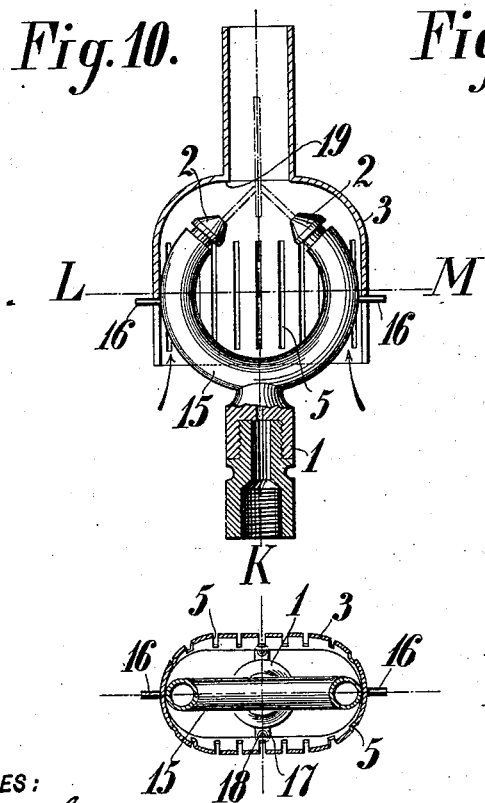
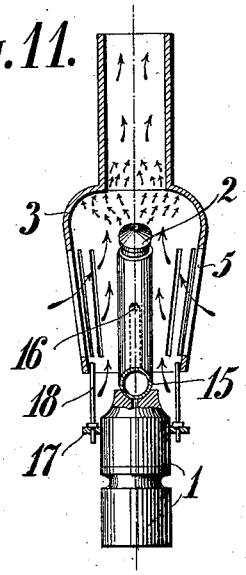
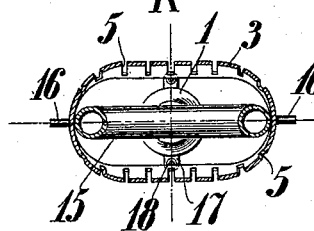

No. 727,257. Patented May 5, 1903.

UNITED STATES PATENT OFFICE.

ADOLF BACHNER, OF FRANKFORT-ON-THE-MAIN, GERMANY.

GAS-BURNER.

SPECIFICATION forming part of Letters Patent No. 727,257, dated May 5, 1903.

Application filed July 21, 1902. Serial No. 116,412. (No model.)

*To all whom it may concern:*

Be it known that I, ADOLF BACHNER, engineer, a subject of the Czar of Russia, and a resident of Werftstrasse 16, Frankfort-on-the-Main, Germany, have invented certain new and useful Improvements in or Relating to Gas-Burners; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

A great drawback of incandescent lamps of the usual type with incandescent burners is the fact that the lamp cannot be used in an emergency when the incandescent mantle or the chimney becomes destroyed and cannot be replaced at once, since the gas flowing from the inlet-nozzle to the burner cannot be used directly for lighting purposes.

The present invention has for its object to overcome this drawback by providing a slip tip or nozzle of the double-hole, fish-tail, or like type in place of the ordinary nozzle of the incandescent burner, so that with an ordinary incandescent-burner attachment and an incandescent mantle the apparatus can be used as an incandescent burner, while by removing the incandescent burner and the incandescent mantle an ordinary gas-flame can be directly utilized for lighting purposes. Further, by the use of a slip-burner giving a fan or fish-tail flame the great advantage is obtained over the present system of incandescent burners that the air-supply and the mixing of the latter with the gas is much improved, as the gas does not stream from the burner in slight sheets, as through an ordinary incandescent nozzle, but in very broad jets, whereby a more intimate mixing of the gas and air or oxygen is produced, thus reducing the gas consumption for a given light intensity or obtaining a greater lighting effect with the same gas consumption. In order to still further increase the outlet-surfaces, and thereby to obtain a still richer supply for the flame than can be produced by a single double-hole split or light burner, several of such burners or tips with outlet-openings for a smaller quantity of gas may be arranged in a mixing-chamber in such a manner that the jets issue at an angle to one another, and thus unite to form a single layer jet or flame.

Figure 4:
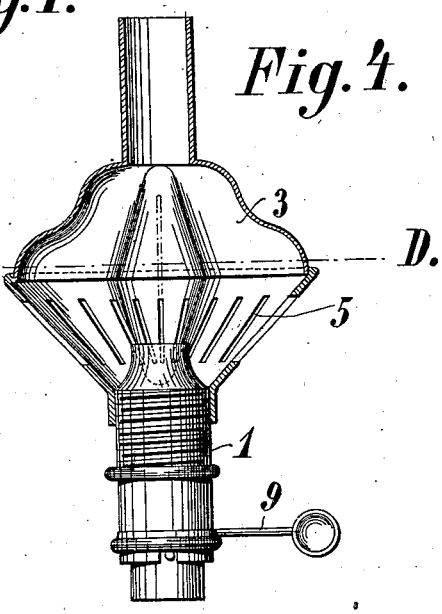
Figure 5:
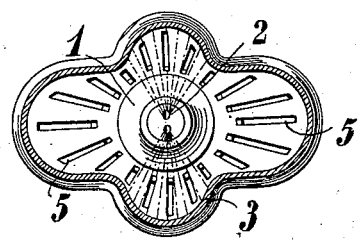
Figure 2:
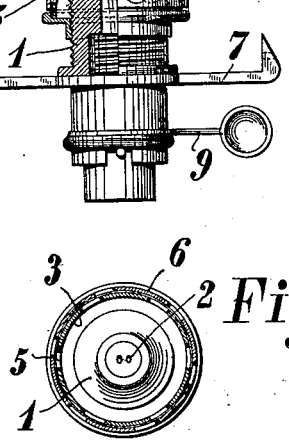
Figure 3:
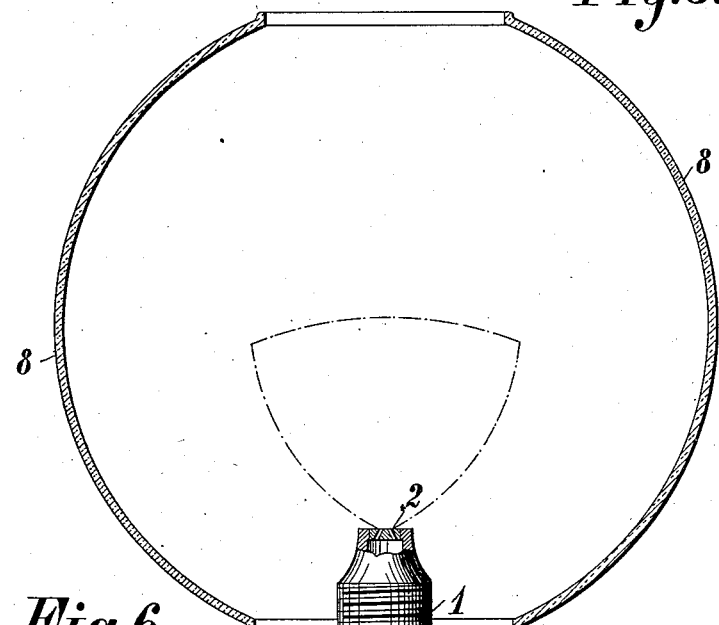
Figure 6:
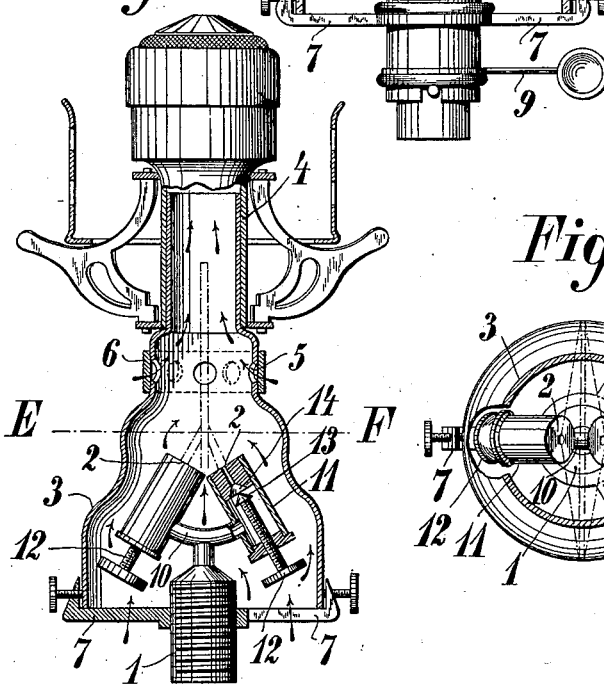
Figure 7:
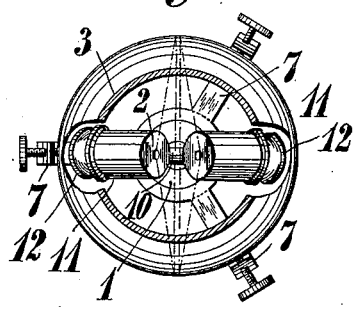

In the accompanying drawings, Figure 1 represents an incandescent burner with a double-hole tip or gas-inlet nozzle adapted when ignited and when the incandescent burner is removed to give an ordinary flat or fish-tail flame. Fig. 2 is a cross-section on the line A B of Fig. 1. Fig. 3 shows the burner with the upper part removed, the nozzle being employed as an ordinary gas burner or tip. Fig. 4 shows an improved form of mixing-chamber for use in connection with the "fish-tail" nozzle. Fig. 5 is a cross-section on the line C D of Fig. 4. Fig. 6 shows a construction with two gas-inlet tips or burners inclined one toward the other. Fig. 7 is a cross-section on the line E F of Fig. 6. Fig. 8 shows a modification with three burners or tips. Fig. 9 is a cross-section on the line G H of Fig. 8. Fig. 10 shows a practical construction with two burners or tips similar to those sometimes used for acetylene gas and with the special mixing-chamber. Fig. 11 is a longitudinal section on the line L K of Fig. 10, and Fig. 12 is a cross-section on the line L M of Fig. 10.

In the construction shown in Figs. 1, 2, and 3 a flat or fish-tail flame tip 2 is arranged in the end of the gas-inlet nozzle 1, the holes being so arranged that the plane of the issuing sheet of gas (or the flame) is vertical to the plane of the outlet-openings and takes a shape somewhat as shown in Fig. 3. Screwed onto the nozzle 1 when the burner is used as an incandescent burner is a mixing-chamber 3, of usual type, upon which is arranged an incandescent burner 4 in the ordinary manner. The mixing-chamber 3 is, as usual, provided with air-inlets 5, which can be more or less closed by a perforated ring 6, adjustable on the chamber 3. Beneath the nozzle 1 is a support 7, Figs. 1 and 3, of circular, triangular, or other convenient shape for carrying the globe 8 when the device is used as an ordinary burner—*i. e.*, with an open flame. In order to allow the apparatus to be used at will as an incandescent burner or as an open-flame burner, means must be provided for the control of the gas admission. As is known, the consumption of gas by an ordinary "open"

burner is much greater than that by incandescent burners, and for this purpose any suitable controlling device or tap 9 is arranged. The gas-admission must for an incandescent burner be reduced, while it must be increased if an ordinary flame is used in order to obtain a convenient lighting effect. In the construction shown in Figs. 4 and 5 the mixing-chamber 3 is of a somewhat double conical cross shape, whereby the outflowing gas impinges against the upper walls and is deflected back in a number of sprays or jets hereby, becoming intimately mixed with the air entering through the perforations in the lower part of the chamber.

In the construction shown in Figs. 6 and 7 two burners 11 are used and set at an angle one toward the other.

By the arrangement of the burners 11 at an angle to one another flat gas-jets are produced, as shown in Figs. 6 and 7, the gas from the two tips impinging against each other and joining to form a single flat flame of very large area, whereby a more intimate mixture with the surrounding air is obtained. The two burners 2 are connected to a common gas-nozzle 1 by a double-armed tube 10. Screwed onto the gas-nozzle 1 is a triangular support 7, which when the lamp is used as an incandescent lamp serves for the reception of the mixing-chamber 3, while it carries the globe when the apparatus is used as an ordinary burner. Mounted upon the mixing-chamber 3 is in the former case the incandescent burner 4. The air-admission to the mixing-chamber 3 is effected from below through the gallery or support 7, as indicated by the arrows, while a further air-supply is obtained through the air-ports 5, formed in the upper part of the mixing-chamber 3 and regulated by an adjustable perforated ring 6. Headed screws 12 are arranged in the burners 11 for controlling the gas-admission, the screws being provided with conical inner ends 13, so that these conical ends can be introduced into corresponding conical recesses 14 in the burner-tips 2, thereby cutting off more or less the supply of gas through the tips. A burner of this construction is preferably adapted for the use of acetylene gas, methylated spirit, or other vapor. A somewhat similar construction to that described above is shown in Figs. 8 and 9. In this case in order to increase the lighting-flame or the amount of gas issuing from the supply-tube, and consequently to effect a stronger admission of air, three or more tips 2 may be arranged to give a large flame or gas area.

In the construction shown in Figs. 10, 11, and 12 a curved gas-supply pipe 15 is used and provided with two tips 2, directed inwardly and upwardly at an angle to form a flat combined flame or jet. This arrangement gives a small and flat construction of burner. The mixing-chamber 3 is of a flat cupped shape, somewhat restricted at its open bottom part. The chamber is simply slipped over the double-armed burner 15 and is held in position by pins 16 on the latter and, further, by rods 18, secured to a ring 17, attached to the nozzle 1. In the walls of the mixing-chamber 3 are air-admission openings 5 in the form of longitudinal slots, which allow of a very good supply of air. The gas flows from the two tips 2 in the manner indicated in Fig. 10. The jet of gas strikes against the upper domed part 19 of the mixing-chamber 3, whereby a whirling motion is effected and very intimate mixing of the air and gas is obtained.

Having thus described my invention, what I claim as new therein, and desire to secure by Letters Patent of the United States of America, is—

1. A convertible gas-burner, comprising a gas-supply nozzle provided with a tip having converging holes, a mixing-chamber, an incandescent burner supported on said mixing-chamber, and means for removably connecting said nozzle with the mixing-chamber so as to permit the use of the burner as an incandescent burner or as an ordinary burner, substantially as set forth.

2. A convertible gas-burner, comprising a plurality of gas-supply nozzles having tips with converging holes, a mixing-chamber extending around said nozzles, an incandescent burner on said mixing-chamber, and means for attaching said mixing-chamber removably to the nozzle for permitting the use of the burner as an incandescent burner or as an ordinary gas-burner, substantially as set forth.

3. A convertible gas-burner, comprising a gas-supply nozzle provided with a tip having converging holes, a dome-shaped mixing-chamber having openings in the lower part of the same, an incandescent burner supported on said mixing-chamber, and means for removably connecting said nozzle with the mixing-chamber so as to permit the use of the burner as an incandescent burner or as an ordinary burner, substantially as set forth.

In testimony that I claim the foregoing as my invention I have signed my name in presence of two subscribing witnesses.

ADOLF BACHNER.

Witnesses:
 HENRY HASPER,
 WOLDEMAR HAUPT.